(12) United States Patent
Trautmann et al.

(10) Patent No.: US 11,168,773 B2
(45) Date of Patent: Nov. 9, 2021

(54) TRANSMISSION DEVICE FOR A MOTOR VEHICLE

(71) Applicant: AUDI AG, Ingolstadt (DE)

(72) Inventors: Carsten Trautmann, Wolfsburg (DE); Christian Meixner, Ingolstadt (DE); Christian Wirth, Moosinning / Eichenried (DE); Jürgen Tschullik, Berching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/641,429

(22) PCT Filed: Aug. 24, 2018

(86) PCT No.: PCT/EP2018/072845
§ 371 (c)(1),
(2) Date: Feb. 24, 2020

(87) PCT Pub. No.: WO2019/038414
PCT Pub. Date: Feb. 28, 2019

(65) Prior Publication Data
US 2021/0164553 A1     Jun. 3, 2021

(30) Foreign Application Priority Data

Aug. 25, 2017   (DE) ..................... 10 2017 214 916.7

(51) Int. Cl.
*F16H 48/36*   (2012.01)
*F16H 48/11*   (2012.01)
(Continued)

(52) U.S. Cl.
CPC .............. *F16H 48/36* (2013.01); *B60K 1/00* (2013.01); *B60K 17/16* (2013.01); *F16H 48/11* (2013.01);
(Continued)

(58) Field of Classification Search
CPC .............. F16H 48/11; F16H 2048/106; F16H 2048/364; B60K 6/485
See application file for complete search history.

(56) References Cited

U.S. PATENT DOCUMENTS 3,420,121 A * 1/1969 Stieg ....................... F16H 48/10
                                                              475/252
4,245,524 A * 1/1981 Dammon ............... B62D 11/10
                                                              180/6.7
(Continued)

FOREIGN PATENT DOCUMENTS

DE    102008061946 A1   6/2010
DE    102009031645 A1   1/2011
(Continued)

OTHER PUBLICATIONS

English-language translation of International Preliminary Report on Patentability dated Mar. 5, 2020, in corresponding International Application No. PCT/EP2018/072845; 10 pages.
(Continued)

*Primary Examiner* — Sherry L Estremsky
(74) *Attorney, Agent, or Firm* — Maier & Maier, PLLC

(57) ABSTRACT

A transmission device for a motor vehicle, having an input shaft, which is operatively connectable to a drive device of the motor vehicle, and a first output shaft and a second output shaft, and comprising a spur gear differential transmission which is designed as a planetary transmission, by means of which the input shaft is coupled to the first output shaft and the second output shaft. It is provided that the spur gear differential transmission comprises a first sun gear coupled to the first output shaft and a second sun gear coupled to the second output shaft, wherein the first sun gear meshes with a first planet gear which is rotatably mounted on a planet gear carrier coupled to the input shaft, which first planet gear also meshes with a second planet gear which is (Continued)

likewise rotatably mounted on the planet gear carrier and which meshes with the second sun gear.

9 Claims, 3 Drawing Sheets

(51) Int. Cl.
    *B60K 1/00*     (2006.01)
    *B60K 17/16*     (2006.01)
    *F16H 48/10*     (2012.01)

(52) U.S. Cl.
    CPC .. *F16H 2048/106* (2013.01); *F16H 2048/364* (2013.01)

(56) References Cited

U.S. PATENT DOCUMENTS

| | | | | |
|---|---|---|---|---|
| 5,624,346 | A * | 4/1997 | Hirota | F16H 48/10 |
| | | | | 475/249 |
| 8,974,341 | B2 * | 3/2015 | Smetana | H02K 7/112 |
| | | | | 475/8 |
| 9,777,816 | B2 * | 10/2017 | Petersen | F16H 37/0813 |
| 10,641,375 | B2 * | 5/2020 | Kurth | B60K 17/00 |
| 10,648,549 | B2 * | 5/2020 | Kurth | F16H 48/30 |
| 2014/0315675 | A1 | 10/2014 | Watanabe | |
| 2020/0116236 | A1 * | 4/2020 | Biermann | F16H 48/11 |
| 2020/0347917 | A1 * | 11/2020 | Trautman | B60K 6/48 |

FOREIGN PATENT DOCUMENTS

| | | | | |
|---|---|---|---|---|
| DE | 102009056366 A1 * | 6/2011 | ........... | B60K 17/165 |
| DE | 102009056366 A1 | 6/2011 | | |
| DE | 102009059903 A1 | 6/2011 | | |
| DE | 102010036240 A1 | 3/2012 | | |
| DE | 102011007455 A1 * | 10/2012 | ............ | B60K 17/08 |
| DE | 102012220970 A1 | 5/2014 | | |
| DE | 102013202382 A1 | 8/2014 | | |
| DE | 102014204575 A1 * | 9/2015 | ............ | F16H 48/36 |
| DE | 102014016077 A1 | 5/2016 | | |
| GB | 535515 A * | 4/1941 | ............ | F16H 48/08 |
| JP | 2001039179 A | 2/2001 | | |
| WO | WO-2014075671 A * | 5/2014 | ............ | B60L 50/16 |
| WO | 2016/066732 A1 | 5/2016 | | |

OTHER PUBLICATIONS

German Examination Report dated Aug. 6, 2018 in corresponding German Application No. 10 2017 214 916.7; 14 pages; Machine translation attached.

International Search Report and Written Opinion dated Nov. 20, 2018 in corresponding International Application No. PCT/EP2018/072845; 28 pages; Machine translation attached.

German Office Action dated Feb. 24, 2021, in connection with corresponding DE Application No. 10 2017 214 916.7 (12 pp., including machine-generated English translation).

* cited by examiner

TRANSMISSION DEVICE FOR A MOTOR VEHICLE

FIELD

The disclosure relates to a transmission device for a motor vehicle, having an input shaft, which is operatively connectable to a drive device of the motor vehicle, and a first output shaft and a second output shaft, and comprising a spur gear differential transmission which is designed as a planetary transmission, by means of which the input shaft is coupled to the first output shaft and the second output shaft.

BACKGROUND

The transmission device serves, for example, for transmitting a torque between a drive device of the motor vehicle on the one hand and a wheel axle of the vehicle, on the other hand. By the transmission device, the wheel axle is operatively connected or at least can be operatively connected to the drive device. The wheel axle accordingly is a driven wheel axle. It may be configured as a front wheel axle or a rear wheel axle of the motor vehicle. The transmission device comprises the input shaft as well as the first output shaft and the second output shaft.

The input shaft of the transmission device is connected to the drive device of the motor vehicle, preferably across a manual transmission and/or a clutch, especially a starter clutch. By means of the manual transmission, one of many gearings can be selected and adjusted between the drive device and the input shaft of the transmission device. The clutch is preferably designed as a shift clutch and especially preferably as a starter clutch. With the aid of the clutch, the operative connection can accordingly be made or broken between the drive device and the input shaft of the transmission device by choice.

The drive device comprises at least one drive unit, which is designed for example as an internal combustion engine or an electric machine. Of course, the drive device may also be a hybrid drive device comprising multiple drive units, which are preferably of different type. In this case, one of the drive units is an internal combustion engine, for example, or another of the drive units is an electric machine. If the drive device comprises multiple drive units, it is preferably configured such that the drive units together provide at least some of the time a driving torque for the driving of the motor vehicle.

The input shaft of the transmission device is coupled across the planetary transmission to both the first output shaft and the second output shaft, especially in permanent manner. The planetary transmission constitutes a spur gear differential transmission, i.e., a differential transmission comprising multiple intermeshing spur gears. Quite generally, the spur gear differential transmission works as a differential transmission or equalizing transmission.

In the prior art, the document WO 2016/066732 A1 is known, for example. This discusses a transmission device for a motor vehicle, comprising an input shaft operatively connectable to a drive unit as well as a first output shaft and a second output shaft, the first output shaft being operatively connected or able to be operatively connected across a first transmission to a first partial shaft of a wheel axle and the second output shaft being so connected across a second transmission to a second partial shaft of the wheel axle.

SUMMARY

The problem which the invention proposes to solve is to propose a transmission device having advantages over known transmission devices, in particular, one which realizes in simple manner a "torque vectoring" functionality between the two output shafts in especially space-saving manner.

This is achieved according to the disclosure with a transmission device. It is provided that the spur gear differential transmission comprises two sun gears, namely, a first sun gear coupled to the first output shaft and a second sun gear coupled to the second output shaft, wherein the first sun gear meshes with a first planet gear which is rotatably mounted on a planet gear carrier coupled to the input shaft, which first planet gear also meshes with a second planet gear which is likewise rotatably mounted on the planet gear carrier and which meshes with the second sun gear.

The spur gear differential transmission comprises two sun gears, namely, the first sun gear and the second sun gear. Each of the sun gears is coupled to one of the output shafts, namely, preferably rigidly and/or permanently. Preferably each of the sun gears is decoupled from the other respective output shaft, i.e., connected to it in any case via the spur gear differential transmission, but not rotationally firmly. Accordingly, therefore, the first sun gear is coupled to the first output shaft and decoupled from the second output shaft. Conversely, the second sun gear is coupled to the second output shaft and decoupled from the first output shaft.

Furthermore, the spur gear differential transmission comprises the planet gear carrier, on which the at least one first planet gear and the at least one second planet gear are rotatably mounted. The transmission device may comprise just one first planet gear or multiple first planet gears. Similarly, the transmission device may comprise just one second planet gear or multiple second planet gears. Preferably, the spur gear differential transmission has as many first planet gears as second planet gears and vice versa.

The first planet gear meshes with exactly one second planet gear. In the case of multiple first planet gears, each of the first planet gears meshes with exactly one of the second planet gears. Accordingly, each time one of the first planet gears is arranged in a pair with one of the second planet gears. The paired gears mesh with each other. Preferably, the second planet gear and the first planet gear have different numbers of teeth. They also possess the same modulus, in order to make possible their intermeshing. Alternatively, of course, it is possible for the first planet gear and the second planet gear to be designed with the same number of teeth.

The first planet gear meshes with the first sun gear, preferably permanently, but not with the second sun gear. Conversely, the second planet gear meshes with the second sun gear, preferably permanently, but not with the first sun gear. For this, the first planet gear and the second planet gear are arranged with an offset from each other in the circumferential direction, but preferably they are located at the same radial position relative to an axis of rotation of the first output shaft and/or the second output shaft.

The planet gear carrier is coupled to the input shaft, preferably rigidly and/or permanently. Thus, ultimately the input shaft is coupled preferably permanently to both the first output shaft and the second output shaft. The first sun gear, the second sun gear, the first planet gear and the second planet gear are each preferably designed as a spur gear. The two output shafts are for example arranged coaxially to each other, and in particular the first output shaft is rotatably mounted in the second output shaft.

It may be provided that the first output shaft is or can be placed in operative connection with a first partial shaft of the wheel axle, especially across a first transmission, and the second output shaft is or can be operatively connected to a second partial shaft of the wheel axle, especially across a second transmission. Preferably, the first output shaft is coupled permanently and/or rigidly to the first partial shaft and the second output shaft is coupled permanently and/or rigidly to the second partial shaft. The first transmission and the second transmission may each be configured as a crown gear transmission, so that the axes of rotation of the two partial shafts are angled with respect to the axes of rotation of the output shafts, i.e., they make an angle with them which is larger than 0° and smaller than 180°.

The described design of the transmission device enables a very compact embodiment, which can still realize a "torque vectoring" functionality.

A further embodiment of the invention calls for the first planet gear to be present as a first stepped planetary gear, which is coupled rotationally firmly to a second stepped planetary gear, which can be coupled to the input shaft and/or to an electric machine. The first stepped planetary gear and the second stepped planetary gear are preferably mounted on a common shaft, which is rotatably mounted on the planet gear carrier.

The mounting of the shaft on the planet gear carrier is provided at a bearing location, wherein preferably the first stepped planetary gear on the one hand and the second stepped planetary gear on the other hand is arranged at the bearing location. In other words, the two stepped planetary gears are present on opposite sides of the bearing location. The two stepped planetary gears may be identical to or different from each other, especially as regards the modulus and/or the number of teeth. Preferably, the two stepped planetary gears are different from each other, especially in regard to the number of teeth. On the other hand, the modulus may be the same for both stepped planetary gears.

For example, the planet gear carrier forms a cage for the first planet gear and/or the second planet gear, the first sun gear and the second sun gear. This means that the planet gear carrier accommodates the mentioned gears in itself and protects them against the outer surroundings. For example, the planet gear carrier is rotatably mounted at its side facing opposite the input shaft in the axial direction at or on the first output shaft and/or the second output shaft. It is now possible, through the second stepped planetary gear, to introduce a further torque into the spur gear differential transmission, especially in order to realize the "torque vectoring" functionality.

In a further embodiment of the invention, it is provided that the input shaft is arranged coaxially to the first output shaft and/or the second output shaft. It was already mentioned above that the two output shafts are preferably coaxial to each other and for this purpose are mounted rotatably inside one another. Now, the input shaft should be arranged coaxial to at least one of the output shafts, preferably to both output shafts. However, this lies at a spacing from the first output shaft and/or the second output shaft in the axial direction relative to its axis of rotation. The coaxial arrangement of the shafts makes possible on the one hand a space-saving design of the transmission device and on the other hand a simple integration in the motor vehicle.

Another preferred embodiment of the invention calls for the spur gear differential transmission to be designed with no ring gear. In other words, the spur gear differential transmission comprises only the first sun gear, the second sun gear, the planet gear carrier and the at least one first planet gear and the at least one second planet gear and furthermore optionally the at least one second stepped planetary gear. Eliminating the ring gear significantly reduces the space requirement of the spur gear differential transmissions in the radial direction with respect to the axis of rotation of the input shaft.

Another embodiment of the invention calls for the second stepped planetary gear to mesh with a gear that is connected rotationally firmly to an intermediate shaft. The gear is rigidly and/or permanently connected to the intermediate shaft, preferably it is rotatably mounted via the intermediate shaft. The gear and the intermediate shaft are preferably arranged coaxially to the input shaft, i.e., they have at least the same axis of rotation as it. For example, the input shaft is rotatably mounted in the intermediate shaft, i.e., it is received at least for a portion in it.

The gearing between the gear and the second stepped planetary gear may correspond to the gearing between the first sun gear and the first stepped planetary gear, i.e., it may be identical to it. Preferably, however, a gearing different from this is provided between the gear and the second stepped planetary gear. For example, an outside device, especially an electric machine, can be attached in space-saving manner via the intermediate shaft, especially as long as the intermediate shaft and the input shaft are coaxial to each other.

An especially preferred modification of the invention calls for an electric machine to be able to be coupled by means of a shifting device to the input shaft and/or the intermediate shaft. The electric machine serves in particular for realizing the "torque vectoring" functionality. This is the case when it is coupled to the intermediate shaft. Alternatively or additionally, however, the electric machine may be or become coupled to the input shaft. If the electric machine is coupled to the input shaft, it serves for providing an additional torque to the input shaft, which is superimposed on the driving torque provided by the drive device. The torque provided by the electric machine may be positive or negative, so that ultimately the electric machine is operated either as an electric motor or as a generator.

By means of the shifting device, the electric machine can be coupled to the input shaft and/or the intermediate shaft. Preferably, therefore, the operative connection between the electric machine and the input shaft or the intermediate shaft can be selectively made or broken with the aid of the shifting device. Especially preferably, the shifting device serves for selectively decoupling the electric machine from both the input shaft and the intermediate shaft, for connecting it to the input shaft, or for connecting it to the intermediate shaft. With such a design of the shifting device, an especially flexible use of the electric machine is possible.

One modification of the invention calls for the electric machine to be coupled rotationally firmly in a first shifting position of the shifting device to the input shaft and in a second shifting position to the intermediate shaft. The shifting device accordingly makes it possible to adjust at least two shifting positions, namely, the first shifting position and the second shifting position. In the first shifting position, the electric machine is coupled rotationally firmly to the input shaft and in the second shifting position to the intermediate shaft. Especially preferably, furthermore, a third shifting position is provided, in which the electric machine is decoupled from both the input shaft and the intermediate shaft. This configuration makes possible the above described flexible use of the electric machine.

Another embodiment of the invention calls for the shifting device to comprise a first output gear coupled rotationally firmly to the input shaft, a second output gear coupled rotationally firmly to the intermediate shaft and an input gear coupled rotationally firmly to the electric machine, wherein a coupling element of the shifting device in the first shifting position meshes with the first output gear and the input gear and is disengaged from the second output gear and in the second shifting position it meshes with the second output gear and the input gear and is disengaged from the first output gear. For example, for this purpose the coupling element can be moved in the axial direction relative to the axis of rotation of the input shaft, namely, at least between the first shifting position and the second shifting position. It becomes clear that the coupling element will serve each time to couple together two gears in rotationally fixed manner, namely, in the first shifting position the first output gear and the input gear and in the second shifting position the second output gear and the input gear. In each of the shifting positions, the other one of the respective output gears is disengaged from the coupling element.

For example, at least the output gears are configured as spur gears, while the input gear may be present as a ring gear or also as a spur gear. In the former case, the coupling element has an internal toothing as well as an external toothing; in the latter case, only an internal toothing. The internal toothing may in each case be brought into engagement with either the first output gear or the second output gear, depending on the shifting position of the coupling element. At the same time, the coupling element preferably stands in permanent engagement with the input gear, while either the internal toothing or the external toothing meshes with it.

It has already been pointed out above that the shifting device especially preferably comprises a third shifting position, in which the electric machine is decoupled from both the input shaft and the intermediate shaft. In this third shifting position, for example, the coupling element meshes only with the input gear or with the input gear and an auxiliary gear, which may be mounted free in rotation, but at least is decoupled from the input shaft and the intermediate shaft.

Additionally or alternatively it may be provided in another embodiment of the invention that the electric machine is coupled across a coupling planetary transmission to the shifting device, especially the input gear. Accordingly, the electric machine is not attached directly to the shifting device, especially not to the input gear. Instead, the coupling planetary transmission is provided in the connection between the electric machine and the shifting device or the input gear, bringing about a gearing between the electric machine and the shifting device.

The coupling planetary transmission comprises, for example, a sun gear coupled to the electric machine, a stationary ring gear, and a planet gear carrier connected to the shifting device, on which at least one planet gear is rotatably mounted, the planet gear meshing with both the ring gear and the sun gear. The mentioned connections are preferably rigid and/or permanent. With the aid of the coupling planetary transmission, the electric machine can be adapted especially easily to the particular application of the transmission device.

Finally, in another preferred embodiment of the invention it may be provided that the coupling planetary transmission is a two-step type and it connects the electric machine to the input gear and a further input gear of the shifting device. The coupling planetary transmission in other words is connected on the one hand to the electric machine and on the other hand to the input gear and the further input gear, so that at a given rpm of the electric machine the input gear and the further input gear have different rpm. Hence, with the aid of the coupling planetary transmission, different transmission ratios can be realized between the electric machine and the shifting device.

For example, the coupling planetary transmission in addition to the aforementioned elements of sun gear, ring gear and planet gear carrier with planet gear comprises a further sun gear and a further ring gear. The further sun gear is coupled rotationally firmly to the sun gear, preferably rigidly and/or permanently, and accordingly also to the electric machine. The ring gear is coupled to the further input gear, likewise preferably rigidly and/or permanently. Now, on the planet gear carrier there is mounted rotatably a further planet gear, which meshes on the one hand with the further sun gear and on the other hand with the further ring gear. The further planet gear is decoupled from the planet gear, i.e., it is mounted rotatably, independently of the latter, on the planet gear carrier.

A first gearing is present between the planet gear and the sun gear or the ring gear, and a second gearing is present between the further planet gear and the further sun gear or the further ring gear. In other words, the first gearing is realized between the electric machine and the input gear and the second gearing between the electric machine and the further input gear. The shifting device may now be adapted, for example, so that it selectively connects the input gear to the first output gear and the second output gear in the manner described above, or optionally it decouples both the input gear and the further input gear from the two output gears.

In a fourth shifting position of the shifting device it may additionally be provided that the further input gear is coupled to the first output gear so that the electric machine is also coupled to the input shaft in the fourth shifting position. Such a configuration of the transmission device makes possible, on the one hand, the "torque vectoring" functionality already described above and on the other hand an attachment of the electric machine to the input shaft with a gearing selected from two different gearings.

BRIEF DESCRIPTION OF THE DRAWINGS

The disclosure shall now be explained more closely below with the aid of the exemplary embodiments presented in the drawing, without this being a limitation of the invention. There are shown.

DETAILED DESCRIPTION

Figure 1:
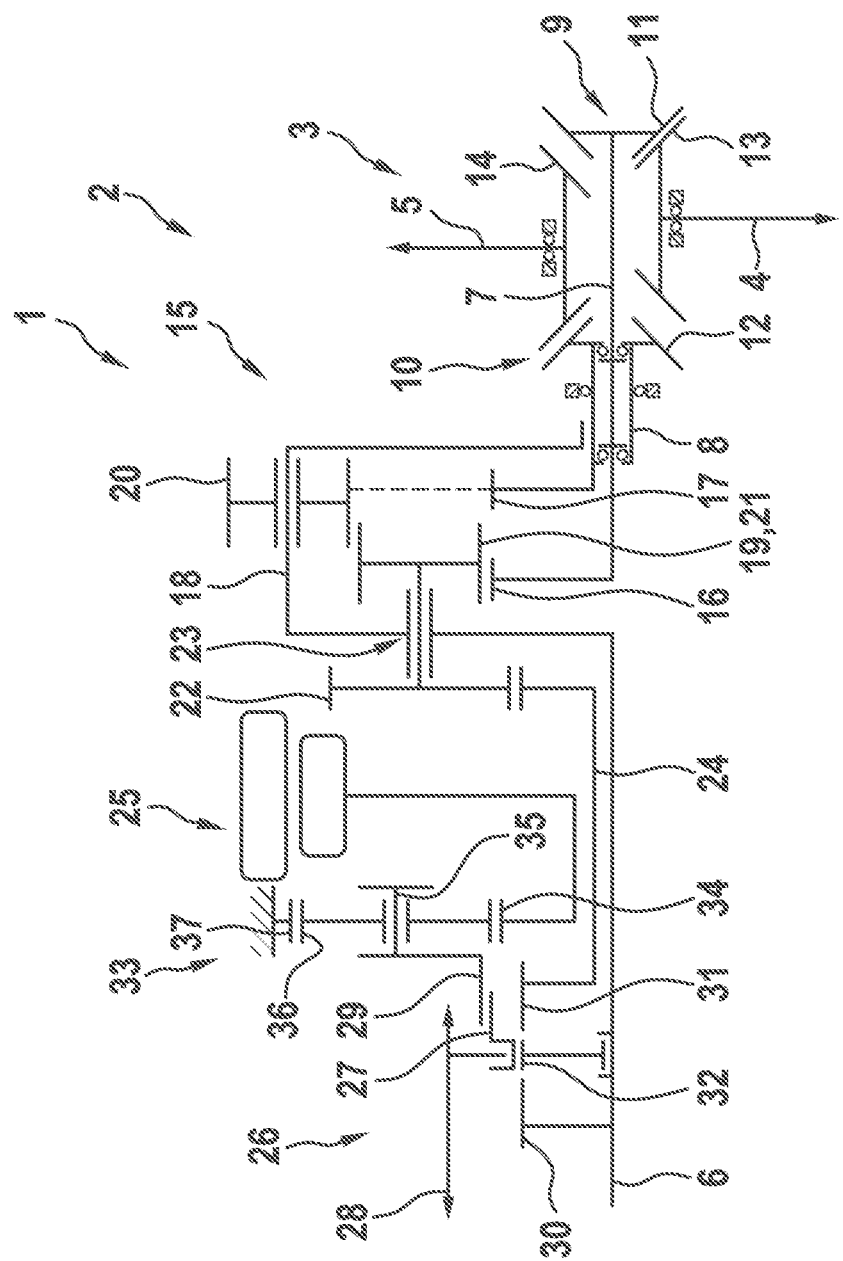
FIG. 1 a schematic representation of a transmission device for a motor vehicle in a first embodiment, FIG. 2 a schematic representation of the transmission device in a second embodiment, and FIG. 3 a schematic representation of the transmission device in a third embodiment.

FIG. 1 shows a schematic representation of a first embodiment of a transmission device 1, which is provided here for example as part of a motor vehicle 2 not shown in detail. The motor vehicle 2 has a wheel axle 3 with a first partial shaft 4 and a second partial shaft 5. The wheel axle 3 or the partial shafts 4 and 5 can be driven across the transmission device 1 by means of a drive device of the motor vehicle 2. The drive device is or at least can be operatively connected to an input shaft 6 of the transmission device 1. The first partial shaft 4, on the other hand, is connected to a first output shaft 7, and the second partial shaft 5 to a second output shaft 8 of the transmission device 1, or they are operatively connected to the respective output shaft 7 or 8.

The operative connection between the first partial shaft 4 and the first output shaft 7 is produced by a first transmission 9, the operative connection between the second partial shaft 5 and the second output shaft 8 by a second transmission 10. The transmissions 9 and 10 may be in the form of angle gear transmissions. Preferably, they are designed as a bevel gear transmission and accordingly they each possess a first bevel gear 11 or 12 and a second bevel gear 13 or 14. According to the present embodiment of the transmission device 1 here, it may be provided that the partial shafts 4 and 5 or their axes of rotation in the lateral or radial direction are offset from each other relative to the axes of rotation. However, alternatively, the partial shafts 4 and 5 may also be arranged coaxial to each other, i.e., aligned with each other at least in a top view.

The output shafts 7 and 8 may be angled relative to the partial shafts 4 and 5 or the wheel axle 3, i. e., making with it an angle of more than 0° and less than 180°, such as an angle of 90°. The corresponding deflection is realized with the aid of the transmissions 9 and 10, which are in the form of angle transmissions. Of course, alternatively, the transmissions 9 and 10 may be designed as spur gear transmissions. For example, the output shafts 7 and 8 in this case are arranged parallel to the partial shafts 4 and 5.

The transmission device 1 comprises a spur gear differential transmission 15, by which the first output shaft 7 and the second output shaft 8 are operatively connected or coupled permanently to the input shaft 6. For this purpose, the spur gear differential transmission 15 is designed as a planetary transmission, having a first sun gear 16, a second sun gear 17 and a planet gear carrier 18, on which a first planet gear 19 and a second planet gear 20 are rotatably mounted. The planet gear carrier 18 is coupled to the input shaft 6 of the transmission device 1, especially in rigid and/or permanent manner. The first sun gear 16, on the other hand, is coupled to the first output shaft 7, and the second sun gear 17 is coupled to the second output shaft 8, preferably in rigid and/or permanent manner. The first planet gear 19 meshes with the second planet gear 20, preferably in permanent manner. The first planet gear 19 furthermore meshes with the first sun gear 16, but not with the second sun gear 17. The second planet gear 20, on the other hand, meshes with the second sun gear 17, but not with the first sun gear 16.

The first planet gear 19 is designed as a first stepped planetary gear 21, which is coupled rotationally firmly to a second stepped planetary gear 22. The two stepped planetary gears 21 and 22 are together mounted rotatably on the planet gear carrier 18, being present preferably on opposite sides of a bearing location 23 on the planet gear carrier 18. The second stepped planetary gear 22 is rotationally firmly coupled to an intermediate shaft 24, especially in rigid and/or permanent manner. It can clearly be seen that the two output shafts 7 and 8 as well as the input shaft 6 and the intermediate shaft 24 are arranged coaxial to each other, i.e., they have the same axis of rotation. The second output shaft 8 here accommodates the first output shaft 7 at least for a portion, and likewise the intermediate shaft 24 accommodates the input shaft 6 at least for a portion. It should further be pointed out in particular that the spur gear differential transmission 15 is a design without ring gear, i.e., it has no ring gear.

The transmission device 1 comprises an electric machine 25, which can be coupled by a shifting device 26 to the input shaft 6 and/or the intermediate shaft 24. The shifting device 26 comprises a coupling element 27, which can move according to the double arrow 28 in the axial direction. In the embodiment represented here, the shifting device 26 comprises an input gear 29, a first output gear 30 and a second output gear 31. Furthermore, an auxiliary gear 32 may be provided.

The coupling element 27, now, is configured such that it can mesh permanently with the input gear 29 of the shifting device 26. In a first shifting position, it meshes additionally with the first output gear 30, but not with the second output gear 31 or the auxiliary gear 32. In a second shifting position, on the other hand, it meshes additionally with the second output gear 31, but not with the first output gear 30 or the auxiliary gear 32. In a third shifting position, it meshes additionally with the auxiliary gear 32, but not with the two output gears 30 and 31.

The input gear 29 is coupled to the electric machine 25, preferably in rigid and/or permanent manner. The first output gear 30 is firmly coupled to the input shaft 6 and the second output gear 31 firmly to the intermediate shaft 24, likewise preferably in rigid and/or permanent manner. The auxiliary gear 32, on the other hand, is decoupled from both the input shaft 6 and the intermediate shaft 24 and accordingly is mounted free to turn.

The connection between the electric machine 25 and the shifting device 26 or the input gear 29 is via a coupling planetary transmission 33. This comprises a sun gear 34, a planet gear carrier 35 with planet gear 36 mounted rotatably on it, and a ring gear 37. The sun gear is coupled to the electric machine 25, preferably in rigid and/or permanent manner. The ring gear 37, on the other hand, is stationary. The planet gear 36 now meshes both with the sun gear 34 and with the ring gear 37. The planet gear carrier 35 is coupled to the shifting device 26, especially the input gear 29, particularly in rigid and/or permanent manner.

With the aid of the shifting device 26, the electric machine 25 can be coupled either to the input shaft 6 or the intermediate shaft 24. In the former case, the electric machine 25 can provide a torque, which is superimposed on a torque provided by the drive device on the input shaft 6. In this case, therefore, the driving torque can be increased or decreased with the aid of the electric machine 25.

In the second shifting position of the shifting device 26, on the other hand, the electric machine 25 can be used to provide a "torque vectoring" functionality. In this mode, the driving torque present on the input shaft 6 can be divided between the two partial shafts 4 and 5 by providing an additional torque with the aid of the electric machine 25, namely, in such a way that a desired torque distribution is established between them. This means that, with the aid of the electric machine 25, the driving torque can be freely apportioned on the output shafts 7 and 8 and hence on the partial shafts 4 and 5.

Figure 2:
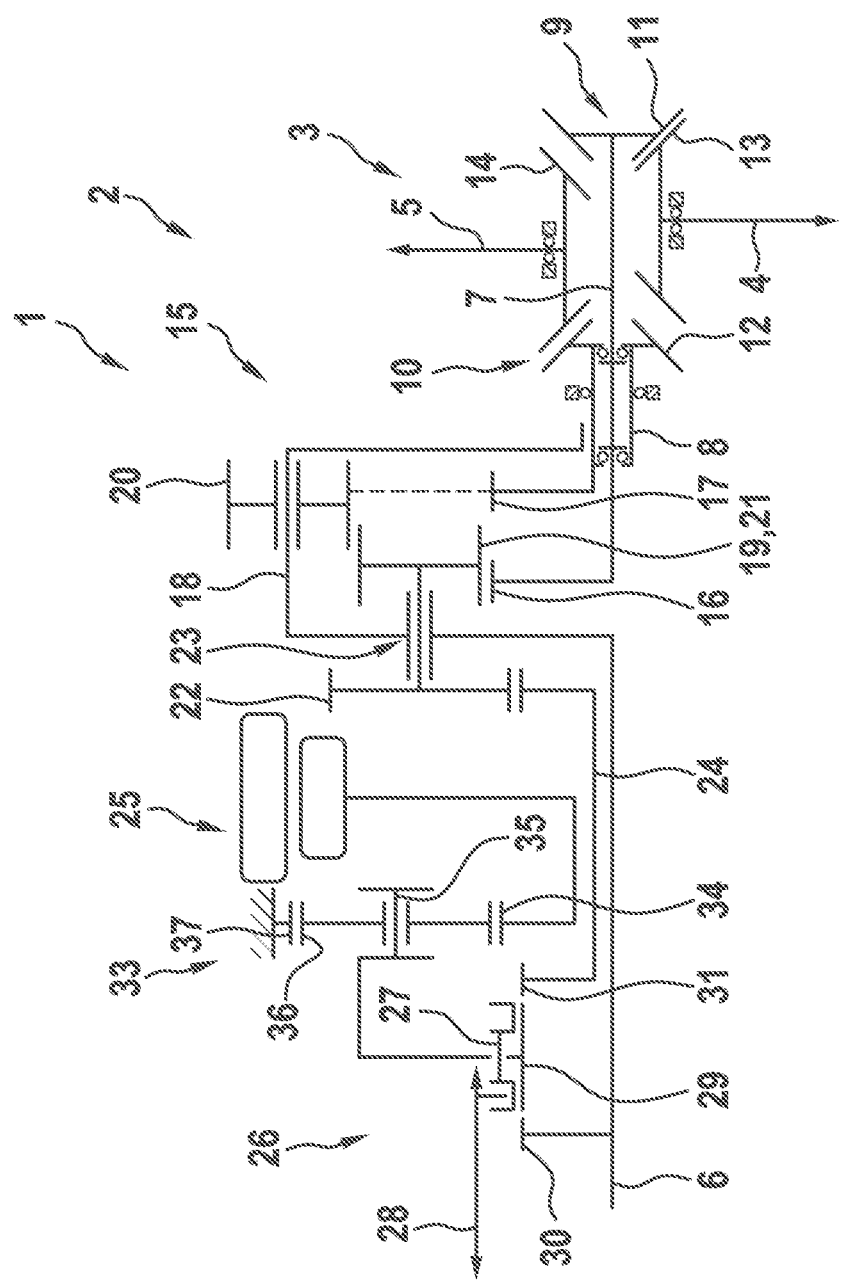

FIG. 2 shows a schematic representation of the transmission device 1 in a second embodiment. This is basically similar in configuration to the first embodiment, so that in the following only the differences shall be discussed, otherwise referring to the preceding remarks. The differences lie in the design of the shifting device 26. Whereas in the case of the first embodiment the input gear 29 was designed as a ring gear, it is now present as a spur gear and it is situated between the first output gear 30 and the second output gear 31, looking in the axial direction. However, the functionality is identical to the shifting device 26 of the above described first embodiment. As compared to this, the auxiliary gear 32 may be omitted, as is the case here.

Figure 3:
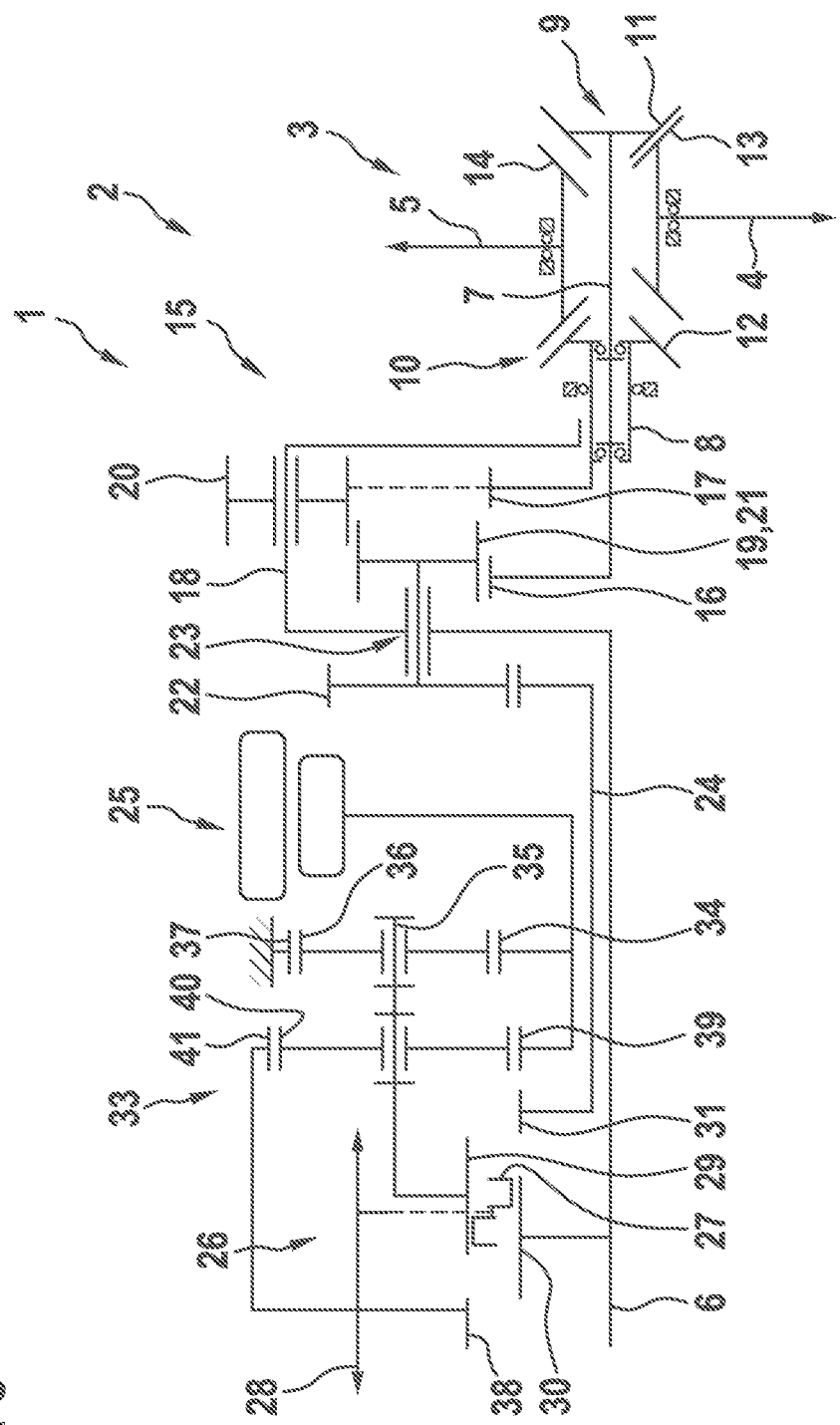

FIG. 3 shows a third embodiment of the transmission device 1 in a schematic representation. Once again, reference is made to the preceding remarks, especially those for the first embodiment, and the differences shall be pointed out in the following. These lie in the fact that the coupling planetary transmission 33 is a two-step type, so that the electric machine 25 is coupled across the coupling planetary transmission 33 to both the input gear 29 and to a further input gear 38, preferably in rigid and/or permanent manner. For this, the coupling planetary transmission 33 comprises a further sun gear 39, a further planet gear 40 and a further ring gear 41.

The sun gear 39 is coupled to the sun gear 34 and hence to the electric machine 25, preferably in rigid and/or permanent manner. The planet gear 40 is mounted rotatably on the planet gear carrier 35, yet is independent of the planet gear 36. The planet gear 40 meshes on the one hand with the sun gear 39 and on the other hand with the ring gear 41. The ring gear is rotatably mounted and coupled to the input gear 38, preferably in rigid and/or permanent manner. The planet gears 36 and 40 preferably have different numbers of teeth, so that a first gearing can be established between the electric machine 25 and the input gear 29 and a second gearing between the electric machine 25 and the further input gear 38, the two gearings being different from each other.

In addition to the shifting positions already described above, a fourth shifting position of the shifting device 26 may now exist, in which the coupling element 27 meshes with the input gear 38 instead of the input gear 29, while at the same time it meshes with the first output gear 30. Accordingly, a different gearing can established between the electric machine 25 and the input shaft 6 than that in the first shifting position.

The described transmission device 1 has the advantage, in particular, that the spur gear differential transmission 15 is designed with no ring gear and accordingly can be realized with slight axial design space. Furthermore, the shifting device 26 makes possible a flexible attachment of the electric machine 25, either for driving the input shaft 6 or for providing the "torque vectoring" functionality by driving the intermediate shaft 24.

The invention claimed is:

1. A transmission device for a motor vehicle, comprising:
   an input shaft, which is operatively connectable to a drive device of the motor vehicle, and a first output shaft and a second output shaft, and comprising a spur gear differential transmission which is designed as a planetary transmission, by means of which the input shaft is coupled to the first output shaft and the second output shaft, wherein the spur gear differential transmission comprises a first sun gear coupled to the first output shaft and a second sun gear coupled to the second output shaft, wherein the first sun gear meshes with a first planet gear which is rotatably mounted on a planet gear carrier coupled to the input shaft, which first planet gear also meshes with a second planet gear which is likewise rotatably mounted on the planet gear carrier and which meshes with the second sun gear;
   wherein an electric machine is coupled across a coupling planetary transmission to a shifting device and an input gear.

2. The transmission device according to claim 1, wherein the first planet gear is present as a first stepped planetary gear, which is rotatably mounted to a second stepped planetary gear, which can be coupled to the input shaft and to the electric machine.

3. The transmission device according to claim 2, wherein the second stepped planetary gear meshes with a gear that is connected to an intermediate shaft.

4. The transmission device according to claim 3, wherein the electric machine can be coupled by means of the shifting device to the input shaft or the intermediate shaft.

5. The transmission device according to claim 3, wherein the electric machine is coupled rotationally firmly in a first shifting position of the shifting device to the input shaft and in a second shifting position to the intermediate shaft.

6. The transmission device according to claim 5, wherein the shifting device comprises a first output gear coupled to the input shaft, a second output gear coupled rotationally firmly to the intermediate shaft and wherein the input gear coupled rotationally firmly to the electric machine, wherein a coupling element of the shifting device, in the first shifting position, meshes with the first output gear and the input gear and is disengaged from the second output gear and, in the second shifting position, meshes with the second output gear and the input gear and is disengaged from the first output gear.

7. The transmission device according to claim 1, wherein the input shaft is arranged coaxially to the first output shaft and/or the second output shaft.

8. The transmission device according to claim 1, wherein the spur gear differential transmission is designed with no ring gear.

9. The transmission device according to claim 1, wherein the coupling planetary transmission is a two-step type and connects the electric machine to the input gear and a further input gear of the shifting device.

* * * * *